United States Patent
Xuan

[11] Patent Number: 6,121,573
[45] Date of Patent: Sep. 19, 2000

[54] FIBER-LASER WINCHESTER SLIDER FOR MICRO-TO-NANO MACHINING ON DATA STORAGE MEDIA SURFACES

[75] Inventor: Jialuo J. Xuan, Milpitas, Calif.

[73] Assignee: Seagate Technology, Inc., Scotts Valley, Calif.

[21] Appl. No.: 09/145,171

[22] Filed: Sep. 1, 1998

Related U.S. Application Data

[60] Provisional application No. 60/056,047, Sep. 2, 1997.

[51] Int. Cl.[7] .................................................. B23K 26/36

[52] U.S. Cl. ................................. 219/121.68; 219/121.69

[58] Field of Search ...................... 219/121.68, 121.69, 219/121.67, 121.78, 121.8; 360/103; 369/112; 264/400

[56] References Cited

U.S. PATENT DOCUMENTS

| | | |
|---|---|---|
| 4,141,050 | 2/1979 | Wiseley ..................................... 360/103 |
| 4,435,736 | 3/1984 | Herman ..................................... 360/103 |
| 4,550,241 | 10/1985 | Scott et al. .......................... 219/121.67 |
| 5,105,408 | 4/1992 | Lee et al. ................................. 369/112 |
| 5,210,929 | 5/1993 | von Huene et al. . |
| 5,850,375 | 12/1998 | Wilde et al. ............................. 369/112 |
| 5,887,009 | 3/1999 | Mandella et al. . |

*Primary Examiner*—Geoffrey S. Evans
*Attorney, Agent, or Firm*—McDermott, Will & Emery

[57] ABSTRACT

A method and apparatus for micro-to-nano machining a surface attaches a fiber laser output to an air-bearing slider. As the surface to be machined is moved under the slider, an air-bearing is formed that maintains the fiber laser output a substantially constant distance form the surface by tracking the surface undulations.

16 Claims, 4 Drawing Sheets

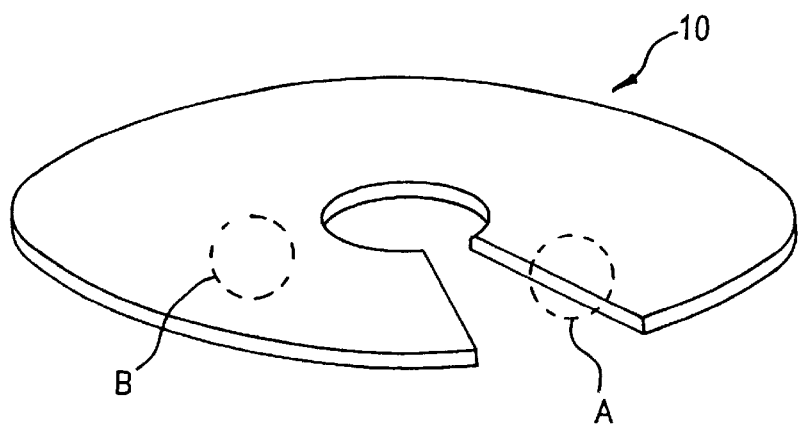
FIG. 1
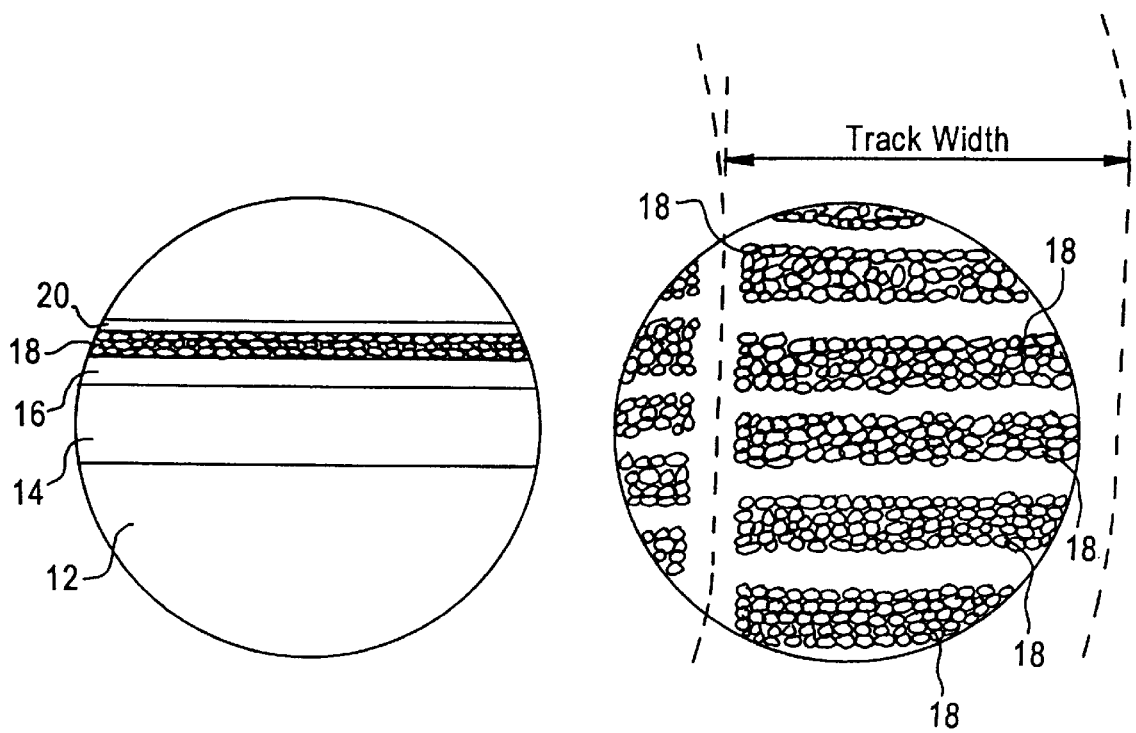
FIG. 2A
FIG. 2B

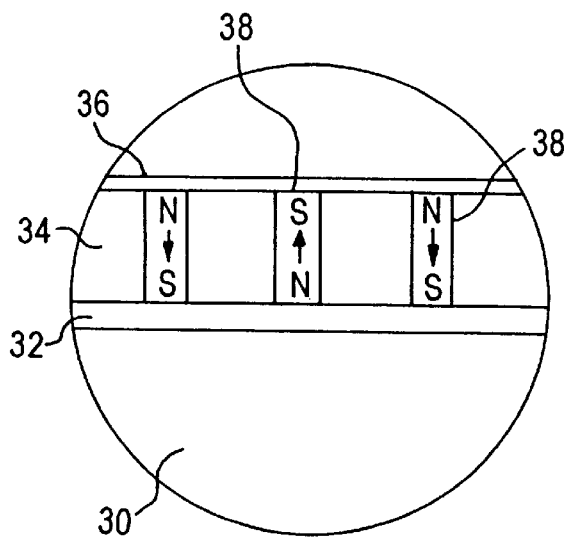
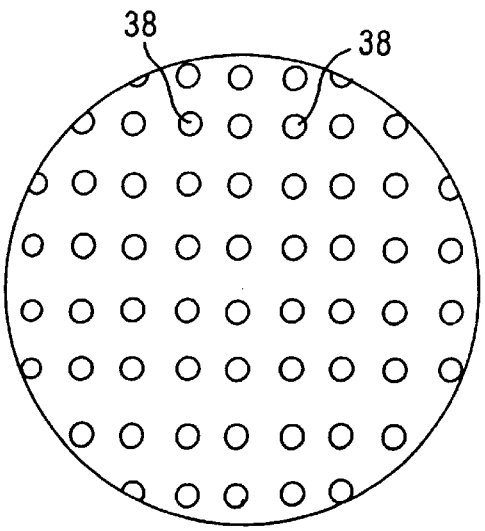
FIG. 3A　　　　　　　　FIG. 3B
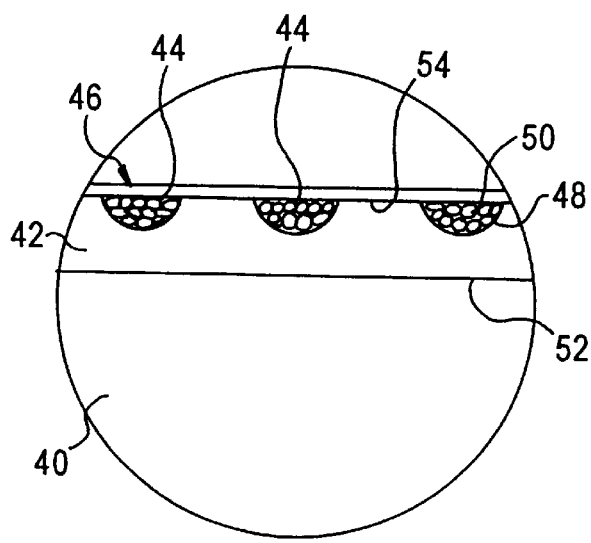
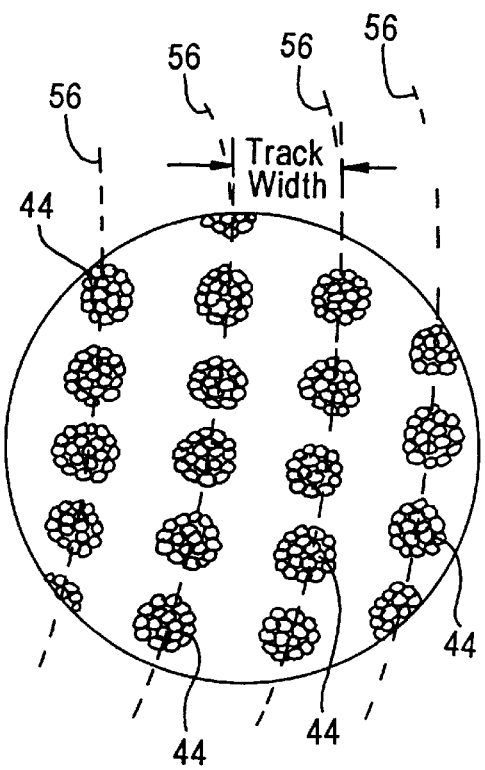
FIG. 4A　　　　　　　　FIG. 4B

FIBER-LASER WINCHESTER SLIDER FOR MICRO-TO-NANO MACHINING ON DATA STORAGE MEDIA SURFACES

RELATED APPLICATIONS

This application claims priority from provisional Patent Application Ser. No. 60/056047, filed Sep. 2, 1997, the entire disclosure which is hereby incorporated by reference therein.

Some of the subject matter disclosed in this application is similar to subject matter disclosed in copending application Ser. No. 09/075,876, currently pending, filed on May 12, 1998 entitled "ISOLATED SINGLE-DOMAIN HIGH-DENSITY MAGNETIC RECORDING MEDIA AND METHOD OF MANUFACTURING THE MEDIA".

FIELD OF THE INVENTION

The present invention relates generally to machining a surface with a laser. The present invention is particularly applicable to laser machining a disk surface for a high a real density magnetic recording medium.

BACKGROUND OF THE INVENTION

The costs of electronic data storage have been dramatically reduced as the storage densities on recording media have increased. This trend is particularly evident in hard disk drive technology. A conventional magnetic recording disk 10 for use in hard disk drives is depicted in FIG. 1. A cross section A of FIG. 1 is enlarged and depicted schematically in FIG. 2A. A typical recording disk 10 includes an aluminum (Al) substrate 12 covered by a nickel phosphorous (NiP) plating 14. A chromium (Cr) underlayer 16 is provided on the nickel phosphorous plating. A magnetic material such as nickel, cobalt (Co), or a magnetic alloy is electroplated or sputtered onto the chromium underlayer 16 to form a continuous magnetic layer 18. A carbon overcoat 20 is deposited on top of the magnetic layer 18 and serves to protect the magnetic layer 18.

An enlarged top view of section B of the recording disk 10 of FIG. 1 is depicted in FIG. 2B. This view is not a physical view, but rather one provided by a magnetic force microscope following writing of data onto the disk 10. As recorded by a write head, the bits are substantially rectangular in shape and arranged in concentric tracks. In the illustrated example, a track width is approximately 2,000 nm. A small separation exists between the bits within a track as well as between bits of adjacent tracks.

The approximate dimensions of a conventional magnetic longitudinally recorded bit are as follows. The length of the bit is approximately 2,000 nm, the width of the bit is approximately 150 nm, and the depth of the bit is approximately 15 nm. A magnetic disk 10 that has been formed with a continuous magnetic layer 18 as depicted in FIG. 2A with the bit size described above has a recording density of approximately 1.7 Gbit/in$^2$.

Increases in the areal density of magnetic storage media have been driven by the downward resealing of hard drive assemblies. This resealing includes reducing the size of the grains making up the magnetic layer. In longitudinal recording, each bit is composed of numerous grains in order to maintain an adequate signal-to-noise ratio. However, reducing the grain size in order to reach higher storage densities is limited by the superparamagnetic limit. This limit occurs at the grain size at which thermal energy alone can trigger random magnetic switching of the grains.

A technology has been proposed to greatly increase the recording density of a magnetic disk by using prefabricated discrete, single-domain magnetic elements embedded in a non-magnetic material. As proposed in *Ultra High-Density Recording Storing Data in Nanostructures*, Stephen Chou, *Data Storage,* September/October 1995 (pages 35–40), thin-film magnetic media is replaced by media that includes discrete magnetic elements embedded in a non-magnetic disk by an electron beam. A corresponding cross-section A is depicted in FIG. 3A for a magnetic disk 10 having the proposed quantum magnetic structure. A silicon substrate 30 is covered by a plating base 32. A silicon dioxide layer 34 is provided on the plating base. The silicon dioxide forms a non-magnetic isolation layer in which magnetic columns are provided. The non-magnetic layer 34 has a depth of approximately 100 nm. Magnetic columns 38, approximately 20 nm in diameter, are provided in a vertical orientation in the non-magnetic layer 34. The magnetic columns 38 may be made of nickel or cobalt for example. The non-magnetic layer 34 and the magnetic columns 38 are protected by an overcoat layer 36.

A schematic top sectional view of the proposed quantum magnetic disk is depicted in FIG. 3B, without the overcoat layer 36, to illustrate the arrangement of magnetic columns 38. In contrast to the magnetic force view of FIG. 2E, the view in FIG. 3B is a physical view. The centers of the magnetic columns 38 are separated by a distance of approximately 100 nm and are arranged in a grid-like manner. Each of the magnetic columns 38 represents a single bit for magnetic recording. The size of the bits (approximately 20 nm diameter) and the separation of the columns (approximately 100 nm) produces a recording density of approximately 65 Gbit/in$^2$.

The costs associated with achieving such a large storage density are prohibitive as the proposed manufacture of quantum magnetic disks utilizes expensive semiconductor processing techniques. An exemplary fabrication process was described by Chuo as including electron beam lithography to define the size and location of each bit in the disk. After development and chrome etching, a reactive ion etching step is performed to create a silicon dioxide template with column openings. Nickel or another electromagnetic material is then electroplated into the column openings to form the magnetic columns. The disk is then polished to planarize its surface.

In addition to the greatly increased costs of manufacture of the disks, the proposed quantum magnetic disk requires complicated non-Winchester recording technology not currently available. Hence, although providing a very high recording density, the proposed quantum magnetic disk remains an impractical alternative to conventional magnetic recording media.

A technique for texturing a disk is disclosed in U.S. Pat. No. 5,062,021 in which a laser light beam is focused on a upper surface of non-magnetic substrate. The disclosed method comprises polishing an NiP plated Al substrate to a specular finish, and then rotating the disk while directing pulsed laser energy over a limited portion of the radius, to provide a textured landing zone while leaving the data zone specular. The landing zone comprises a plurality of individual laser spots characterized by a central depression surrounded by a substantially circular raised rim.

Another laser texturing technique is reported by Baumgart et al. with "A New Laser Texturing Technique For High Performance Magnetic Disk Drives," IEEE Transactions On Magnetics, vol. 31, no. 6, pp. 2946–2951, November 1995. See, also, U.S. Pat. Nos. 5,550,696 and 5,595,791.

In copending application Ser. No. 08/666,374 filed on Jun. 27, 1996, a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused light beam is passed through a crystal material to control the spacing between resulting protrusions.

As areal recording density increases, the flying height must be reduced accordingly, thereby challenging the limitations of conventional laser texturing technology for uniformity and precision in texturing a landing zone to form protrusions. The requirements for continuous alignment and adjustment of the laser beam are exacerbated in geographical locations with relatively unstable environmental conditions, such as temperature, vibration and shock, particularly regions susceptible to seismological disturbances such as tremors and earthquakes. Conventional laser delivery systems for texturing a landing zone comprises a system of mirrors and lenses which must be precisely and accurately maintained, particularly as the flying height is reduced to a level of less than about 300 Å, due to inherent undulations of the substrate surface.

The above described limitations on conventional laser delivery systems has not allowed these systems to be used to form micro-to-nano machining of disk surfaces to create consistently reproducible features below approximately 200 nanometers in diameter. In copending application Ser. No. 60/037,627 filed on Jan. 15, 1997, now abandoned a laser texturing technique is disclosed that employs a fiber laser to provide a textured surface on a substrate. The laser light beam source of the system is optically linked to one end of a fiber optic cable. The other end of the fiber optic cable is optically linked to a lens, such as a micro-focusing lens. The micro-focusing lens is then positioned near a surface of a substrate for a magnetic recording medium and maintained in a fixed position, as with conventional clamps. The laser light beam impinges upon the rotating substrate. The clamping of the fiber laser in a fixed position in relation to the surface being textured prevents a constant optical focusing distance from being obtained if the desired optical focusing distance is very small. This is because the position of the output of the laser is fixed, but the substrate surface has inherent undulations that change the optical focusing distance from the laser output. The effect of the surface undulations on the optical focusing distance is not critical unless a substantially consistent optical focusing distance that is very small is required, for example to perform micro-to-nano machining.

There exists a need for a laser machining system which attains a consistent optical focusing distance, even when the distance is very small, while taking into account the inherent undulations of the surface to be machined.

SUMMARY OF THE INVENTION

This and other needs are met by the present invention which provides a machining apparatus comprising a laser and means for machining a surface with the laser. In certain embodiments, the laser is a fiber laser having a fiber output that is carried by a Winchester slider. One of the advantages of the apparatus of the present invention is that the Winchester slider will track the undulations of a surface to maintain the fiber output of the fiber laser at a substantially constant distance from the surface to be machined. Since the focusing distance will be maintained constant, and very near the surface to be machined, a precise spot diameter may be generated by the laser through a micro-focusing lens so that consistently reproducible features are created on the surface.

The earlier stated needs are also met by other embodiments of the present invention which provide a method of machining a surface comprising the steps of: suspending an air-bearing slider, to which a fiber laser output is mounted, over a surface to be machined. The surface is moved under the air-bearing slider to generate an air-bearing under the slider. Laser energy is applied from the fiber laser output on the surface to machine the surface. In certain embodiments, the air-bearing slider is maintained at a substantially constant optical focusing distance from the surface throughout the application of laser energy on the surface. Where the surface is a surface of a magnetic recording disk, the step of moving the surface includes rotating the disk at a speed sufficient to cause the air-bearing to maintain the substantially constant optical focusing distance.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 is a perspective view of a magnetic recording disk with a partially cut-away section.

FIG. 2A is an enlarged schematic cross-sectional portion A of FIG. 1 for a conventional magnetic disk having a continuous layer.

FIG. 2B is a top view of a portion B of FIG. 1 of a conventional magnetic disk as reproduced by a magnetic force microscope.

FIG. 3A is an enlarged schematic view of portion A of FIG. 1 for a quantum magnetic disk.

FIG. 3B is a top view depicting the topology of the top surface of portion B of FIG. 1 for a quantum magnetic disk.

FIG. 4A is a schematic depiction of a cross-section of portion A of FIG. 1 for a magnetic recording disk machined by apparatus constructed in accordance with embodiments of the present invention.

FIG. 4B is a top view of portion B of FIG. 1 for a magnetic recording disk machined by apparatus constructed in accordance with embodiments of the present invention.

BEST MODE FOR CARRYING OUT THE INVENTION

The present invention addresses and solves the difficult problems of maintaining a precise focusing distance to allow micro-to-nano machining of a surface to create consistently reproducible surface features on a substrate of a magnetic recording medium. The present invention accomplishes this while accounting for the inherent surface undulations of the surfaces and problems related to environmental changes, such as temperature, particularly seismological tremors such as those frequently occurring in the western part of the United States. The employment of a fiber laser system with a fiber output coupled to a Winchester type slider in certain embodiments achieves these advantages.

In accordance with the present invention, a laser light beam source is optically linked to one end of a fiber optic cable. The other end of the fiber optic cable is optically linked to a lens, preferably a micro-focusing lens. The micro-focusing lens is mounted in the center cavity of a Winchester slider, which typically has two rails that run the length of the slider and include tapered front air bearing surfaces. The Winchester slider maintains the micro-focusing at a substantially constant optical focusing distance from the surface to be machined by tracking the inherent undulations of the surface.

Figure 5:
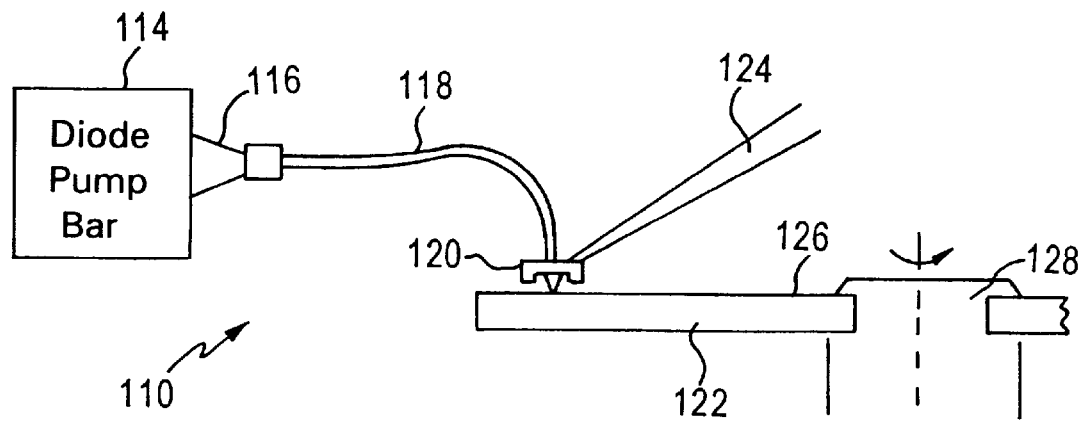
FIG. 5 is a schematic sideview of a disk and an apparatus in accordance with an embodiment of the present invention to perform micro-to-nano machining on the disk.

An exemplary embodiment of the apparatus of the present invention is depicted in FIG. 5. The laser machine arrangement 110 includes a source of laser light 114 that is a laser diode pump bar, for example. An example of a suitable laser 114 is a yttrium aluminum garnet (YAG) laser, for example, with a wavelength of 1.064 $\mu$m. However, other laser sources may be used without departing from the spirit or scope of the present invention. It is preferable to use a modulated single-mode-quality laser to provide the micro-to-nano machining of the surface to be machined. A double-clad fiber 118 is connected to the diode pump bar 114 by a fiber pigtail 116. The expression "pigtail" as herein employed is well known in electrical circuit and fiber optics experimentation and implementation, and denotes a relatively short piece of wire or optical fiber. The double-clad fiber 118 of the fiber laser 110 extends from the fiber pigtail 116 and is mounted at its fiber output to a slider 120. In preferred embodiments of the present invention, slider 120 is an air-bearing slider, such as a Winchester slider.

In an exemplary use of the preset invention, the slider 120 is employed in machining the surfaces of the magnetic recording disk to create recesses in the disk. Hence, in FIG. 5, the slider 120 is depicted as positioned over a surface 126 of a magnetic recording disk 122. A spindle arrangement 128 on which a disk 122 is mounted, operates to rotate the disk 122 underneath the slider 120. A suspension system 124 is coupled to the slider 120 and suspends the slider 120 on or over the surface 126 with a suspension force.

Figure 6:
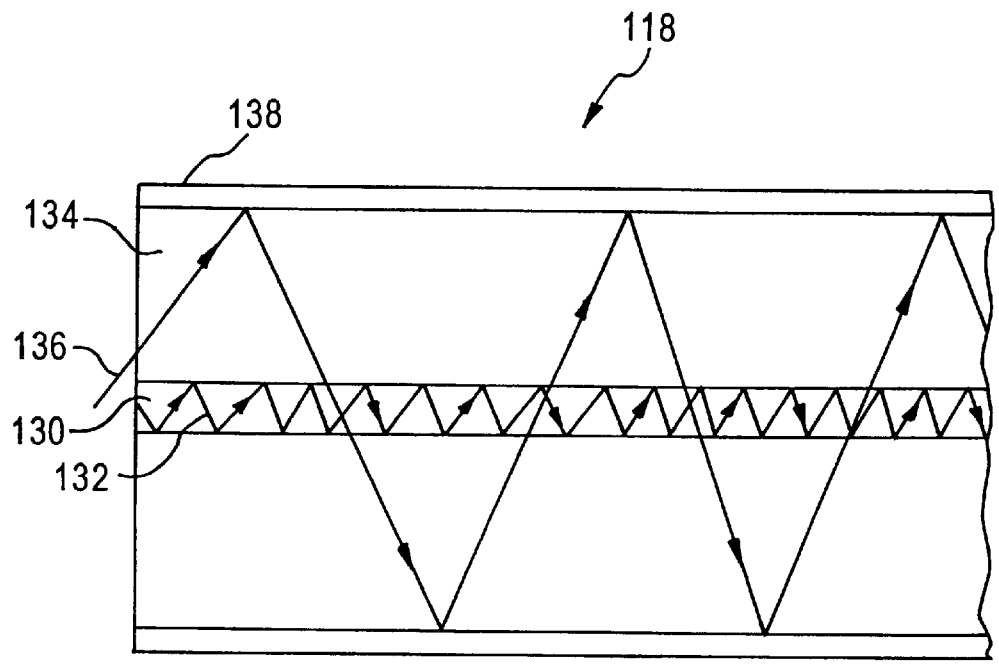
FIG. 6 is a cross-sectional side view of a fiber with a pumping cavity.

The coherent light from the diode pump bar 114 continuously generates a pumping function along the length of the double-clad fiber 118 so that the laser beam emitted out of the fiber output is a nearly perfect single-mode laser energy beam, either in the form of a continuous wave (CW) beam in order to make continuous microgrooves and microridges on the surface or a modulated pulse wave laser beam in order to make discrete micro-features or micro-recesses on the surface. As seen in FIG. 6, which schematically depicts a cross-section of the double-clad fiber 118, coherent pumped light 136 from the diode pump bar 114 continuously generates the pumping function along the fiber length. The fiber 118 is formed by a single-mode fiber core 130 with a multi-spatial mode core 134 which contacts core 130 and an outer layer or clad 138 which contacts core 134. The assembly of core 130, core 134, and clad 138 thus forms a single-mode fiber within a multi-mode fiber which forms the fiber 118. Single-mode core 130 is made of a laser material, i.e. doped with a laser ion such as neodymium.

The multi-mode fiber core 134 and clad 138 define a pump cavity for the single-mode core 130. The index of refraction of the multi-mode core 134 is less than the index of the single-mode core 130, and the index of clad 138 is less than the index of the multi-mode core 134. The indices of refraction and entrance angle of pump radiation 136 are chosen so that pumping radiation 136 which is input into one end of the fiber 118 will be totally internally reflected at the interface between core 134 and clad 138 and propagate along fiber 118, as depicted in FIG. 2. As the pumping radiation 136 propagates along fiber 118 it passes many times through core 130 of laser material, thus providing effective coupling of the pumping radiation to the laser gain medium. The pumping radiation 136 that enters core 130 will also exit core 130 unless it is absorbed in core 130. However, laser radiation 132 produced in core 130 is totally and internally reflected at the interface between core 130 and core 134 so that the laser radiation at 132 is trapped within and propagates along single-mode core 130.

The single-mode core 130 is typically 5–10 microns in diameter, and made of a laser gain material, e.g. Nd-doped laser glass. The core 130 must be doped sufficiently to absorb enough of the pump light. Any rare earth doped laser material may be used, particularly neodymium doped, and also erbium or terbium doped. Any suitable host material which can be formed into a fiber can be used, particularly glass materials. The multi-mode core 134 and clad 138 are typically 50–100 microns in diameter, and made of any suitable fiber materials that transmit the pumping radiation. These parameters are exemplary only, as other sizes of the core may be used without departing from the spirit or scope of the present invention.

Figure 7:
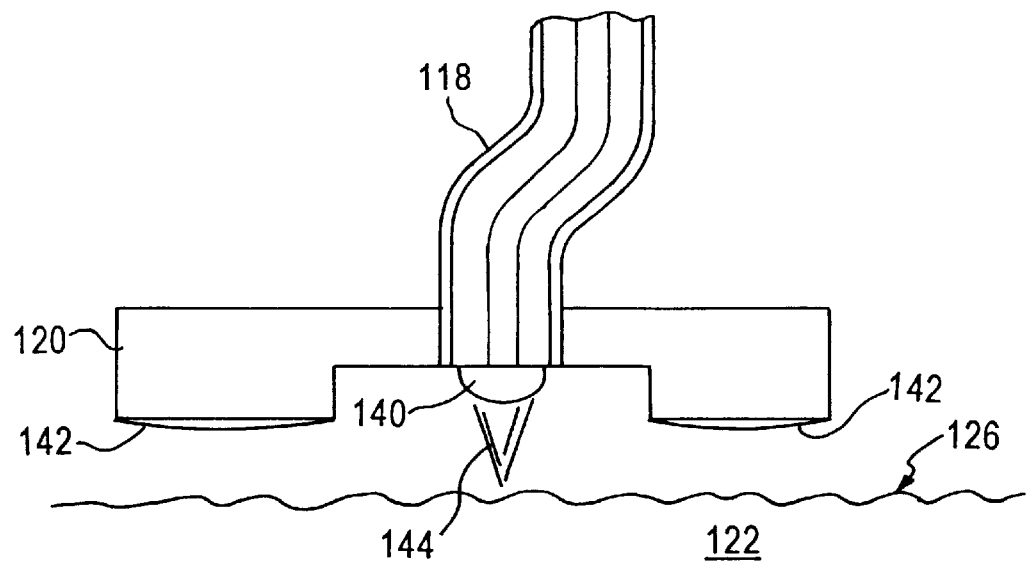
FIG. 7 is a front view of a fiber-end of the laser on a slider positioned over a media surface in accordance with embodiments of the present invention.

FIG. 7 is a front view of the slider 120 flying over the top surface 126 of the recording disk 122. The double-clad fiber 118 is mounted at a center cavity position of the slider 120 between two slider rails 142. At the end of the fiber 118 is a focusing lens 140, such as a micro-focusing lens. The pumped laser beam is focused onto the top surface 126 of the disk 122 through the lens 140. The output of the laser 110 from the micro-focusing lens 140 is indicated by reference numeral 134 in FIG. 7.

The surface features, such as sub-micron recesses, are made by positioning the lens 144 very close to the top surface 126 of the surface to be machined, such as disk 122. The diameter of the focus spot of the laser 110 is governed by the equation: focus spot diameter D=(F/d) $\lambda$, where D is the fiber-laser beam size, F is the focusing length and $\lambda$ is a wave length of the laser 110. To create recesses, for example, with a diameter of approximately 20 nm, the slider 120 flying at 50 nm (20 $\mu$") high with a fiber laser of diameter 0.025 mm and a wavelength of 1.064 $\mu$m may be used. Alternatively, to create the same size surface features, a slider 140 flying at 1000 nm (40 $\mu$") high with a fiber laser of diameter 0.025 mm and a wavelength of 0.532 $\mu$m may be employed.

Figure 8:
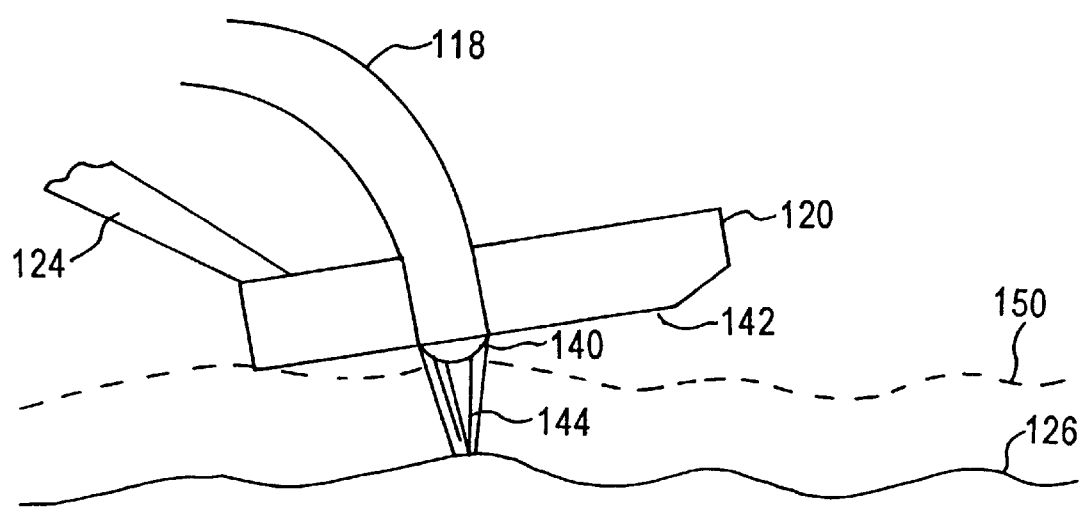
FIG. 8 is a side view of the slider of FIG. 8 positioned over a media surface.

FIG. 8 is a side view of the slider 120 flying over the top surface 126 of the disk 122. When the disk 122 mounted on the spindle 128 is rotating, an air-bearing is generated under the slider rails 142. The air-bearing lifts the slider 120 until the air pressure upward is balanced by the suspension force. After the air-bearing becomes stable, the slider 120 will fly over the disk surface and track the surface undulations at a consistent height. This is represented in FIG. 8 by the track 150 that the micro-focusing lens 140 takes as its path. As shown in FIG. 8, track 150 closely follows the surface 126. This maintains the micro-focusing lens 140 at a precise and constant distance from the top surface 126, even though the surface is an undulating surface.

The use of a slider 120 with a mounted fiber-laser allows precision micro-to-nano machining since the slider 120 will maintain its substantially constant height over the top surface 126 of the disk 122. The present invention may be used, for example, to produce a magnetic recording media that has an isolated single-domain structure with a recording density approximately an order of magnitude greater than that of conventional magnetic media having continuous magnetic layers. Unlike proposed quantum magnetic disks, which use an expensive semiconductor processing technique for fabrication, the apparatus of the present invention produces very high density magnetic disk relatively inexpensively.

A cross-section of portion A of the magnetic recording disk 10 of FIG. 1 manufactured with micro-to-nano machining by a fiber-laser arrangement mounted on a slider in accordance with the present invention is depicted in FIG. 4A. A non-magnetic carrier layer 42 is provided over substrate 40. A wide variety of different types of substrate materials may be used to form the substrate layer 40. These include NiP, Al, glass, ceramic, MMC and AlBC, for example. Since semiconductor processes are not used to form the magnetic recording media according to the present invention, a greater number of different substrate materials may be employed in comparison to formation of quantum magnetic recording media. Similarly, a large variety of different non-magnetic materials may be used in the non-magnetic carrier layer 42, such as chromium (Cr), silicon (Si), other metals or non-metals.

The recording disk 10 manufactured by the apparatus of the present invention has a plurality of isolated single-magnetic domains 44 within the carrier layer 42. Each domain 44 comprises a recess 48 machined in the carrier layer 42, and magnetic material 50 within the recesses 48. The magnetic material may be nickel (Ni) or co-balt (Co), or magnetic alloys, for example, such as Co, Cr, Ti and CoCrPt. The domains 44 are physically and magnetically isolated from each other by the non-magnetic carrier layer 42. A conventional carbon overcoat layer 46 covers the top surface 54 of the carrier layer 42 and the domains 44.

A top view of portion B of a disk 10 as configured in FIG. 1 is shown in FIG. 4B. In this exemplary embodiment, the single domains 44 are arranged on the disk 10 in concentric radial tracks 56. The track width is approximately 200 nm in the illustrated exemplary embodiment, as measured from center-to-center of the domains 44. Note that the view in FIG. 4B is a physical view with the overcoat layer 46 removed, in contrast to the magnetic force microscopic view of FIG. 2B.

According to the present invention, in order to machine disks, recesses may be formed that have average depths between approximately 10 nm and 75 nm and a radius between approximately 25 nm and 100 nm. In one exemplary embodiment, the average depth of the recess 48 is approximately 50 nm and the radius is approximately 10 nm. The domains 44 may be separated by approximately 100 nm (center-to-center). Providing isolated-single magnetic domains with these dimensions on a recording disk produces a recording density of approximately 60–120 Gbits/in$^2$, two order of magnitude greater than conventional magnetic recording media.

The configuration of the recesses 48 formed by the laser output 144 may be altered from a parabolic shape by changing the micro-focusing lens 140, as can be readily appreciated. This allows the recesses and magnetic domains to be configured to match a head that will be used to read/write data on the hard drive. Although the invention has been described with respect to machining a magnetic recording disk, this description is exemplary only as the invention may be applied to machine other types of surfaces. By moving a surface underneath the slider, the air-bearing nature of the slider will maintain the output of the laser at a constant distance above the surface to be machined, providing precision micro-to-nano machining.

Only the preferred embodiment of the invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A machining apparatus comprising:

a laser; and means for machining a surface with the laser wherein the laser is a fiber laser with a laser source and a fiber through which laser energy is transmitted from the laser source to a fiber output;

wherein the means for machining includes a slider which carries the fiber at the fiber output;

which typically has two rails that run the length of the slider and include tapered front air bearing surfaces.

2. The apparatus of claim 1, wherein the laser further includes a focusing lens at the fiber output that focuses the laser energy transmitted through the fiber and out the fiber output.

3. The apparatus of claim 2, wherein the slider has two slider rails and a center cavity between the slider rails in which the fiber output and the focusing lens are mounted.

4. The apparatus of claim 3, wherein the focusing lens is a micro-focusing lens.

5. The apparatus of claim 4, wherein the fiber is a double-clad fiber.

6. The apparatus of claim 5, wherein the laser is a yttrium aluminum garnet (YAG) laser.

7. A machining arrangement for machining a surface, comprising:

a fiber laser having a laser source, a fiber that transmits laser energy from the laser source, and a fiber output from which the laser energy is emitted; and an air-bearing slider that carries the fiber output.

8. The arrangement of claim 7, wherein the slider has two slider rails and a center cavity between the slider rails in which the fiber output is mounted.

9. The arrangement of claim 8, further comprising a micro-focusing lens mounted at the fiber output through which the laser energy from the fiber output is focused.

10. The arrangement of claim 9, further comprising a suspension arrangement on which the slider is mounted, the suspension arrangement and the slider rails configured to maintain the slider at a substantially constant distance from a surface to be machined in response to movement of the surface under the slider.

11. The arrangement of claim 10, wherein the substantially constant distance is between approximately 200 nm and approximately 800 nm.

12. A method of machining a surface comprising the steps of:

suspending an air-bearing slider, to which a fiber laser output is mounted, over a surface to be machined;

moving the surface under the air-bearing slider to generate an air-bearing under the slider; and applying laser energy from the fiber laser output on the surface to machine the surface.

13. The method of claim 12, further comprising maintaining the air-bearing slider at a substantially constant optical focusing distance from the surface throughout the application of laser energy on the surface.

14. The method of claim 13, wherein the surface is a surface of a magnetic recording disk and the step of moving the surface includes rotating the disk at a speed sufficient to cause the air-bearing to maintain the substantially constant optical focusing distance.

15. The method of claim 13, wherein the substantially constant optical focusing distance is between approximately 200 nm and approximately 800 nm.

16. The method of claim 15, wherein the step of applying laser energy includes focusing the laser energy from the fiber laser output through a micro-focusing lens to form a spot size on the surface having a diameter of between approximately 20 nm and 100 nm.

* * * * *